Dec. 17, 1968 JAMES E. WEBB 3,417,332
ADMINISTRATOR OF THE NATIONAL AERONAUTICS
AND SPACE ADMINISTRATION
FREQUENCY SHIFT KEYING APPARATUS

Filed Feb. 11, 1965 2 Sheets-Sheet 1

INVENTORS
David P. Mikszan

BY

ATTORNEYS

INVENTOR
David P. Mikszan
BY
ATTORNEYS

United States Patent Office 3,417,332
Patented Dec. 17, 1968

3,417,332

FREQUENCY SHIFT KEYING APPARATUS

James E. Webb, Administrator of the National Aeronautics and Space Administration with respect to an invention of David P. Mikszan, Glen Burnie, Md.

Filed Feb. 11, 1965, Ser. No. 432,026
8 Claims. (Cl. 325—163)

ABSTRACT OF THE DISCLOSURE

Apparatus for the generation of frequency shifted output signals having no phase discontinuity between the shifted frequency signals. Two squarewave signals having an integral relationship to a clock signal are sequenced to produce one squarewave output signal. The transition from one squarewave signal to the other is made to occur at the end of a whole cycle of the first and at the beginning of a whole cycle of the second resulting in a phase continuous output signal.

This invention relates generally to pulse code modulation systems, and in particular to improved frequency shift keying apparatus for use with pulse code modulation data transmission systems.

Generally, in a pulse code modulation (PCM) data system it is necessary to transmit signals representing the presence or absence of successive pulses coded as binary digits (bits). Accordingly, two distinct signals are required to represent a "1" bit and a "0" bit. One generally accepted technique for transmission of data of this type is to provide signaling apparatus capable of switching between two distinct frequencies that are representative of the "1" and "0" bits. Such signaling techniques are known in the art as frequency shift keying (FSK).

In pulse code modulation data transmission systems employing frequency shift keying it is desirable to provide an output wave signal that is coherent (i.e., having no phase discontinuity) in order to prevent ringing in the bandpass filters used to limit bandwidth in the associated transmitting and receiving equipment. This, in turn, requires shifting between the two frequencies to occur at a predetermined point of a cycle of one frequency and begin at the same point of a cycle of the other frequency. Prior art frequency shift keyers, particularly those using balanced modulators to generate the shift frequencies, are complex, require critical components and adjustments, have proved less than satisfactory in overcoming this problem.

Accordingly, it is an object of the present invention to provide an improved frequency shift keyer for use with pulse code modulation data transmission systems.

Another object of the present invention is to provide a simplified frequency shift keying system that produces a coherent output wave signal to eliminate ringing in the bandpass filters of associated transmitting and receiving equipment.

A feature of the present invention is the provision of a frequency shift keyer utilizing logic circuitry that allows shifting between two discrete frequencies to occur at the end of a whole number of cycles of one frequency and at the beginning of a cycle of the other frequency.

Another feature of the present invention is the provision of the frequency shift keyer utilizing synchronously clocked logic gates wherein a control signal, the clock signal and the shift frequency signals are all in synchronism, and wherein the shift frequency signals are integral multiples of the clock signals. This results in a simple circuit that requires no critical adjustment to produce a coherent output wave signal containing two discrete frequencies.

Figure 1:
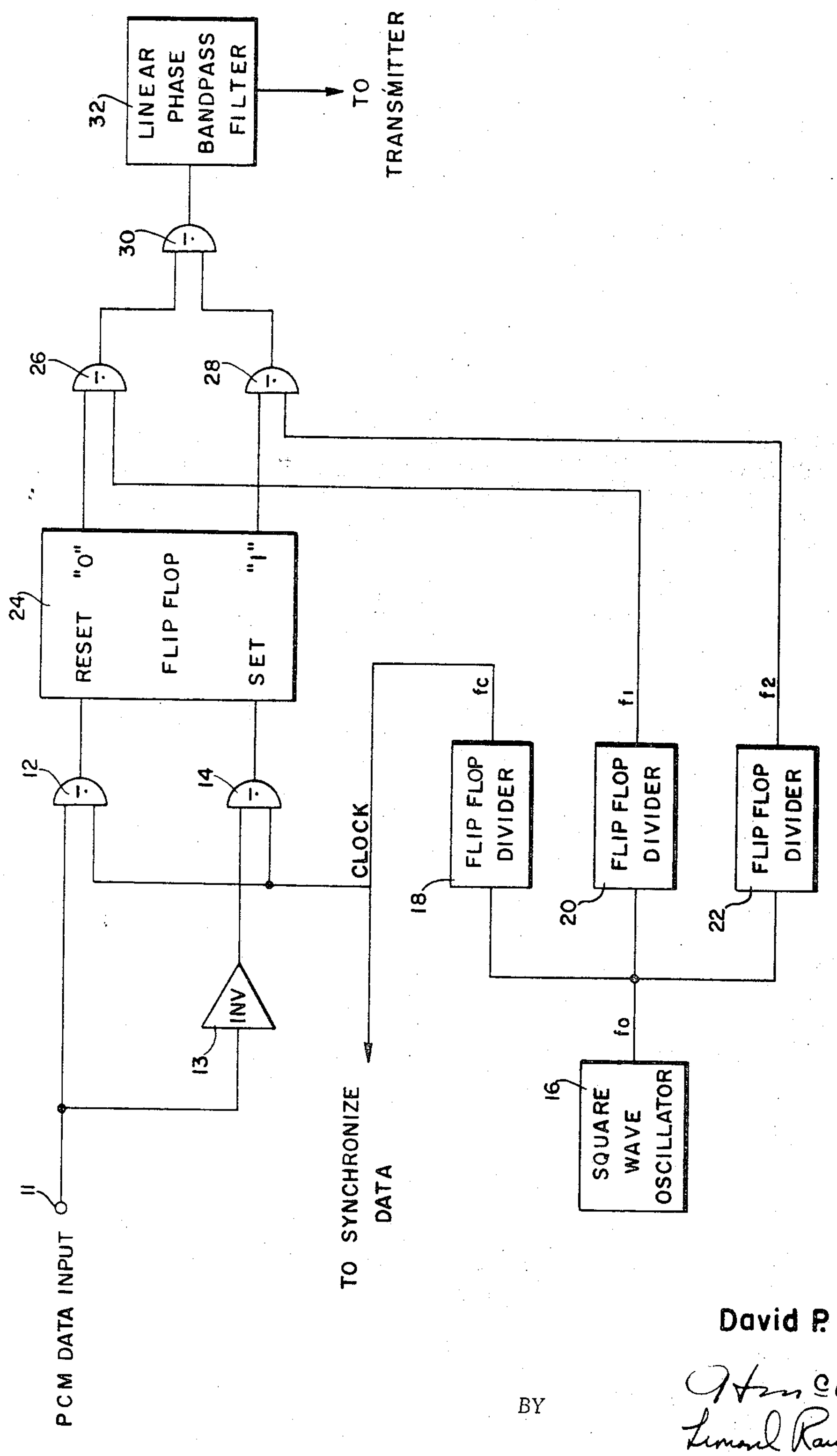
Figure 2:
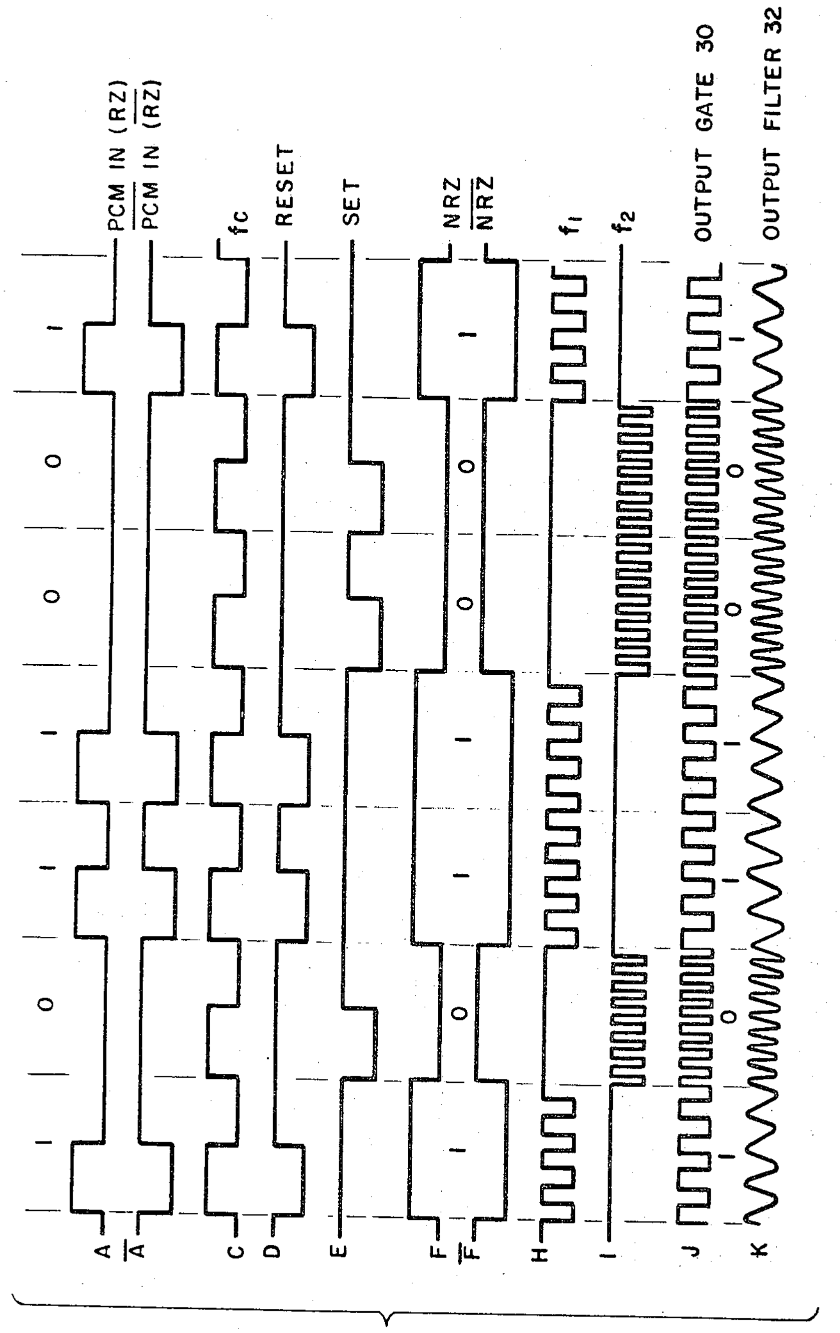

Further objects and features, as well as the attending advantages of the invention will become apparent from the following description when taken in conjunction with the accompanying drawing, in which:

FIGURE 1 is a block diagram of the frequency shift keyer of the present invention; and FIGURE 2 is a series of wave forms useful in understanding the operation of the invention.

In a particular embodiment of the frequency shift keyer of the present invention a fixed frequency square wave oscillator is used to provide a clock signal, at the desired data bit rate, and two shift frequency signals that are integral multiples of the clock signal. The clock signal is used to gate pulse code modulation data and its complement through a first pair of logic gates, thereby providing the set and reset inputs for a flip-flop. The complementary outputs of the flip-flop provide control signals for a second pair of logic gates, with the input of one of the logic gates receiving one shift frequency signal and with the input of the other logic gate receiving the other shift frequency signal. The output of each logic gate of the second pair contains one of the shift frequency signals, and this in turn is fed to an output logic gate operable to pass signals of the two frequencies successively at the data rate established by the clock signal. The clock signal, control signals and the shift frequency signals are synchronized, and the shift frequency signals are integral multiples of the clock signal so that shifting between the two signals in the output logic gate occurs at the end of a while number of cycles of one shift frequency and at the beginning of a cycle of the other shift frequency. A constant time delay bandpass filter extracts the fundamental frequency from the resulting square wave to produce a coherent output wave signal variable between two discrete frequencies without phase discontinuities.

With reference now to FIGURE 1, pulse code modulation data appearing at input terminal 11 is applied to one input of NAND gate 12. The PCM data is also fed to inverter 13, and the complement of this PCM data is applied to one input of NAND gate 14. A second input for both NAND gates 12 and 14 is a clock signal ($f_c$) derived from flip-flop divider 18. NAND gates 12 and 14, as well as other NAND gates utilized in the circuit of FIGURE 1, may conveniently be Direct Coupled Transistor Logic elements (DCTL) of conventional configuration. As such, with both inputs high (positive going) a low output (negative going) is produced, and with either one or both inputs low a high output is produced.

The output of flip-flop divider 18 (providing the clock signal $f_c$ for NAND gates 12 and 14) establishes the data bit rate, and accordingly may also be fed back to synchronize the data forming and encoding circuitry that supplies the PCM data to terminal 11. Square wave oscillator 16 provides an input ($f_o$) to drive flip-flop divider 18, and also to drive flip-flop dividers 20 and 22. Flip-flop dividers 20 and 22, in turn, provide first and second shift frequency signals ($f_1$ and $f_2$) that are integral multiples of clock signal $f_c$. Flip-flop dividers 18, 20 and 22 each may be comprised of one or more bi-stable multivibrator stages coupled as a simple counter, providing an output signal that is a square wave. Thus, the flip-flop dividers 18, 20 and 22 are selected so that $f_o=f_cN_c=f_1N_1=f_2N_2$, where $N_c$, $N_1$ and $N_2$ are integers.

The output of NAND gates 12 and 14 are fed to the reset and set inputs, respectively, of flip-flop 24. Flip-flop 24 may be any bi-stable multivibrator operable to change states in response to pulses of appropriate polarity applied to either its set or reset inputs. When driven by logic gates of the type described, this change of state occurs with coincidence of clock signal $f_c$ and the PCM data signal, or its complement, at the input of respective ones of NAND gates 12 and 14.

One output of flip-flop 24 (such as the "0" output) is fed to one input of NAND gate 26, and its complement (such as the "1" output) is fed to one input of NAND gate 28. A second input of NAND gate 26 receives shift frequency signal $f_1$ from the output of flip-flop divider 20 and a second input of NAND gate 28 receives shift frequency signal $f_2$ from the output of flip-flop divider 22.

The outputs of NAND gates 26 and 28 are further fed to first and second inputs of NAND gate 30 and the output of NAND gate 30 is supplied to filter 32. Filter 32 is a linear phase bandpass filter operable to extract the fundamental components from the two shift-frequency square wave signal appearing at the output of NAND gate 30, and to suppress harmonics appearing therein. By way of example, filter 32 may be a Burnell S–89303 linear phase bandpass filter supplied by Burnell and Company, Inc., Pelham, N.Y. The output of filter 32 is fed to any convenient transmitting apparatus for transmitting the resulting wave signal containing two shift frequencies as pulse code modulation data.

Operation of the above described circuit is best understood in conjunction with the waveforms of FIGURE 2. Waveform A represents the PCM data signal applied to terminal 11 and thence to one input of NAND gate 12, and waveform $\overline{A}$ represents its complement applied to one input of NAND gate 14. For purposes of illustration, waveforms A and $\overline{A}$ are shown in the return-to-zero (RZ) format; that is, a pulse of half-bit width is used to mark the "1" bit, with the "0" bit unmarked. Thus the input binary word is: 1011001. It is to be understood that the non-return-to-zero (NRZ) format may also be used. Waveform C represents the clock signal ($f_c$), which is also the data bit rate of the system. As noted, this clock signal is applied to a second input of NAND gates 12 and 14.

The output of NAND gates 12 and 14, providing the reset and set inputs, respectively, for flip-flop 24, is represented by waveforms D and E. It will be noted that a negative going pulse is applied to the reset input of flip-flop 24 whenever the clock signal $f_c$ and the input PCM data signal applied to NAND gate 12 are both at a high level, and that a negative going pulse is applied to the set input of flip-flop 24 whenever the clock signal $f_c$ and the complement of the PCM data applied to NAND gate 14 are both at a high level. This, in turn, causes the "0" and "1" outputs of flip-flop 24 to assume the state shown by waveforms F and $\overline{F}$, respectively. Waveforms F and $\overline{F}$ are thus in the non-return-to-zero format, that is, the NRZ equivalent of the PCM data (RZ type) and its complement. Thus the "1" and "0" bits are represented by high and low levels, with waveform $\overline{F}$ being the complement of waveform F.

Waveforms H and I represent the outputs of NAND gates 26 and 28, respectively. Waveform H includes shift frequency signal $f_1$ whenever waveform F (applied to one input of NAND gate 26) is in the "1" state, and waveform I includes shift frequency signal $f_2$ whenever waveform $\overline{F}$ (applied to one input of NAND gate 28) is in the "1" state. At other times both waveforms H and I are maintained at a high level. In the example shown in FIGURE 2, shift frequency signal $f_1$ is four times the clock signal $f_c$, and shift frequency signal $f_2$ is eight times the clock signal $f_c$. As noted, the frequencies of the signals $f_1$ and $f_2$ are provided as integral multiples of the frequency of clock signal $f_c$ by the action of flip-flop dividers 18, 20 and 22, all driven by square wave oscillator 16.

Shift frequency signals $f_1$ and $f_2$ are combined in the manner represented by waveform J by the action of NAND gate 30. This is so because the signals of waveforms H and I, the outputs of NAND gates 26 and 28, maintain one input of NAND gate 30 at a high level when a shift frequency signal is applied to its other input. Accordingly, waveforms H and I are combined and appear (with a phase inversion) at the output of NAND gate 30 as waveform J. It is to be particularly noted that since the set and reset pulses, and hence the output signals of flip-flop 24 that gate shift frequency signals $f_1$ and $f_2$ through gates 26 and 28 to gate 30, are controlled by clock signal $f_c$, and since shift frequency signals $f_1$ and $f_2$ are integral multiples of clock signal $f_c$, waveform J shifts between frequencies $f_1$ and $f_2$ only at the end of a whole number of cycles of one shift frequency signal and at the beginning of a cycle of the other shift frequency signal.

The output of filter 32 is shown by waveform K, and represents waveform J with the harmonics removed therefrom to thereby provide two sinusoidal signals of frequencies of $f_1$ and $f_2$. Waveform K is a coherent signal, with shifting between signals of frequencies $f_1$ and $f_2$ occurring without any phase discontinuity, to provide the binary word: 1011001.

The invention provides therefore, an improved frequency shift keyer for use with pulse code modulation data transmission systems that eliminates spurious signals arising from phase discontinuity in the output wave signal, thus preventing ringing in the bandpass filters of associated transmitting and receiving equipment. The circuit is simple in construction, requiring no critical adjustment, and may utilize either return-to-zero (RZ) or non-return-to-zero (NRZ) PCM data, the only requirement being that the clock pulse width be equal to or less than the data pulse width and be synchronized with the data pulses. This may be readily achieved by utilizing the clock signal to synchronize the data forming and the encoding circuitry used to supply the PCM data to the input of the circuit.

While a preferred embodiment of the invention has been described with particularity, it is not to be limited to the specific circuit arrangement herein disclosed, and modifications and variations thereof should be obvious to those skilled in the art. For example, other basic logic elements capable of performing equivalent logic functions may be used other than the NAND gates and the flip-flops specifically described. Also, the flip-flop divider providing clock signal $f_c$ may be driven by one of the flip-flop dividers providing shift frequency signals $f_1$ and $f_2$ rather than the square wave oscillator. It is therefore to be understood that within the scope of the appended claims the invention may be practiced other than specifically set forth.

What is claimed as new and desired to be secured by Letters Patent of the United States is:

1. A frequency shift signaling system for converting pulse code modulation data into a frequency varying wave signal suitable for radio transmission, including in combination:

bi-stable circuit means having first and second inputs and first and second outputs providing signals corresponding to one of two stable states;

a clock signal source providing a periodic signal at a given data bit rate;

a source for first and second shift frequency signals, with each shift frequency signal being a periodic signal at a rate that is an integral multiple of said data bit rate;

first gating means coupled to the inputs of said bi-stable circuit means and controlled by said clock signal, said first gating means operable to supply pulse code modulation data to one input of said bi-stable circuit means in synchronism with said clock signal and to supply the complement of said pulse code modulation data to the other input of said bi-stable circuit means in synchronism with said clock signal;

signal combining means;

and second gating means coupled between said source for said shift frequency signals and said signal combining means and controlled by the output signals of said bi-stable circuit means, said second gating means operable to successively apply said first and second shift frequency signals to said signal combining means in a sequence indicative of said pulse code modulation data;

thereby to provide a continuous signal at the output of said signal combining means variable between said first and second shift frequency signals at the end of a whole number of cycles of one frequency and at the beginning of a cycle of the other frequency.

2. The frequency shift signaling system defined in claim 1 and wherein said clock signal and said first and second shift frequency signals are square waves derived from frequency dividers all driven by a common square wave oscillator.

3. The frequency shift signaling system defined in claim 2 and further including filter means coupled to said signal combining means to extract the fundamental frequency from said shift frequency signals to thereby provide a continuous coherent sinusoidal wave signal variable between two discrete frequencies without phase distortion.

4. The frequency shift signaling system defined in claim 2 and wherein said first gating means includes first and second NAND gates, with one input of one NAND gate receiving pulse code modulation data and one input of the other NAND gate receiving the complement of said pulse code modulation data and means for applying said clock signal to a second input of both said NAND gates, with the output of one NAND gate coupled to one input of said bi-stable circuit means and the output of the other NAND gate coupled to the other input of said bi-stable circuit means.

5. The frequency shift signaling system defined in claim 4 and wherein said second gating means includes first and second NAND gates, with one said shift frequency signal applied to one input of one NAND gate and with the other shift frequency signal applied to one input of the other NAND gate, and means coupling one output of said bi-stable circuit means to a second input of one NAND gate and the other output of said bi-stable circuit means to a second input of the other NAND gate.

6. The frequency shift signaling system as defined in claim 5 and wherein said bi-stable circuit means is a flip-flop having its set and reset inputs coupled to selected inputs of the NAND gates of said first gating means, and having its "1" and "0" outputs coupled to selected inputs of the NAND gates of said second gating means.

7. The frequency shift signaling system as defined in claim 5 and wherein said signal combining means is a NAND gate receiving an input from the output of each NAND gate of said second gating means.

8. A frequency shift signaling system for converting pulse code modulation data into a frequency varying wave signal suitable for radio transmission, including in combination:

bi-stable circuit means having first and second inputs and first and second outputs providing signals corresponding to one of two binary states;

a clock signal source providing a square wave signal at a given data bit rate;

a source for first and second shift frequency signals, with each shift frequency signal being a square wave that is an integral multiple of said clock signal;

first gating means comprising a first pair of NAND gates each having an output coupled to a different input of said bi-stable circuit means and having one input controlled by said clock signal, with a further input of one NAND gate receiving pulse code modulation data and with a further input of the other NAND gate receiving the complement of said pulse code modulation data;

signal combining means comprising a further NAND gate;

second gating means comprising a second pair of NAND gates having outputs coupled to the inputs of the further NAND gate of said signal combining means, with each NAND gate of said second pair receiving a different output signal from said bi-stable circuit means at one input, and with each NAND gate of said second pair receiving a different one of said shift frequency signals at another input;

said further NAND gate of said signal combining means providing a square wave signal including said first and second shift frequency signals in a sequence determined by said pulse code modulation data;

and filter means to remove the harmonics from the square wave signal appearing at the output of said further NAND gate to thereby provide a continuous coherent sinusoidal signal variable between said shift frequencies at the end of a whole number of cycles of one frequency and at the beginning of a cycle of another frequency.

References Cited

UNITED STATES PATENTS

| | | | |
|---|---|---|---|
| 3,142,723 | 7/1964 | Fleming | 325—30 X |
| 3,165,583 | 1/1965 | Kretzmer et al. | 325—30 X |
| 3,023,269 | 2/1962 | Maniere | 178—67 X |
| 3,102,238 | 8/1963 | Bosen | 325—30 |

ROBERT L. GRIFFIN, *Primary Examiner.*

WILLIAM S. FROMMER, *Assistant Examiner.*

U.S. Cl. X.R.

178—66